(12) United States Patent
Steuber et al.

(10) Patent No.: US 7,782,100 B2
(45) Date of Patent: Aug. 24, 2010

(54) DRIVING A FULL BRIDGE CIRCUIT

(75) Inventors: Martin Steuber, Buggingen (DE);
Moritz Nitschke, Freiburg (DE)

(73) Assignee: HUETTINGER Elektronik GmbH + Co. KG, Freiburg (DE)

( * ) Notice: Subject to any disclaimer, the term of this patent is extended or adjusted under 35 U.S.C. 154(b) by 0 days.

(21) Appl. No.: 12/390,699

(22) Filed: Feb. 23, 2009

(65) Prior Publication Data

US 2009/0219075 A1 Sep. 3, 2009

(30) Foreign Application Priority Data

Feb. 29, 2008 (DE) .................. 10 2008 012 089

(51) Int. Cl.
*H03K 3/00* (2006.01)
(52) U.S. Cl. .................. 327/110; 327/423; 327/588
(58) Field of Classification Search ............ 327/110, 327/423, 588
See application file for complete search history.

(56) References Cited

U.S. PATENT DOCUMENTS

| | | | |
|---|---|---|---|
| 4,540,899 A * | 9/1985 | Pelly ........................ | 327/110 |
| 6,011,708 A | 1/2000 | Doht et al. | |
| 6,121,800 A * | 9/2000 | Leighton et al. ............ | 327/110 |
| 6,246,599 B1 | 6/2001 | Jang et al. | |
| 6,353,354 B1 * | 3/2002 | Detweiler et al. ........... | 327/423 |
| 6,891,739 B2 * | 5/2005 | Nadd et al. ................. | 363/147 |
| 6,917,084 B2 * | 7/2005 | Baum et al. ................. | 257/401 |
| 7,158,390 B2 | 1/2007 | Choi et al. | |
| 7,692,936 B2 | 4/2010 | Richter | |
| 2005/0041438 A1 | 2/2005 | Chen et al. | |
| 2007/0217239 A1 | 9/2007 | Rottger et al. | |

FOREIGN PATENT DOCUMENTS

| | | |
|---|---|---|
| DE | 19831151 | 7/1999 |
| DE | 10138751 | 3/2003 |
| DE | 19920505 | 5/2004 |
| DE | 102004036160 | 2/2005 |

OTHER PUBLICATIONS

Erickson, Robert W., "Fundamentals of Power Electronics", Kluwer Academic Publishers, Norwell, Massachusetts, 1997, pp. 78-82 and 689-696.
Office Action from German Patent Office from corresponding German Application No. 10 2008 012 089.8, mailed Oct. 21, 2008.
Office Action from German Patent Office from corresponding German Application No. 10 2008 012 089.8, mailed Oct. 21, 2008, with English translation, 4 pages.

* cited by examiner

*Primary Examiner*—Kenneth B. Wells
(74) *Attorney, Agent, or Firm*—Fish & Richardson P.C.

(57) ABSTRACT

A full bridge that produces an alternating output signal can be driven by operating switching elements of the full bridge in each period in a switching sequence that determines the order of the activation and deactivation of the switching elements. The switching elements are switched in at least two different switching sequences, a first switching sequence is repeated n times before a second switching sequence is carried out, with n>1, or the switching elements are switched in at least three different switching sequences.

17 Claims, 3 Drawing Sheets

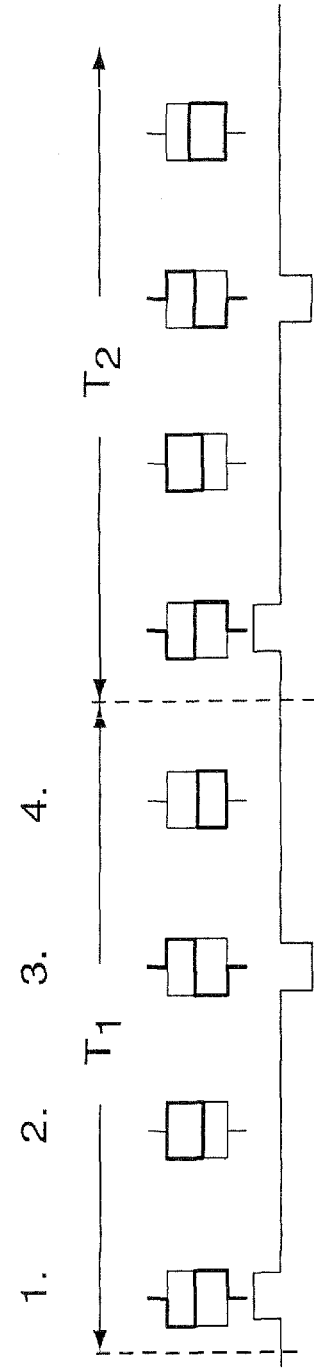
Fig. 3
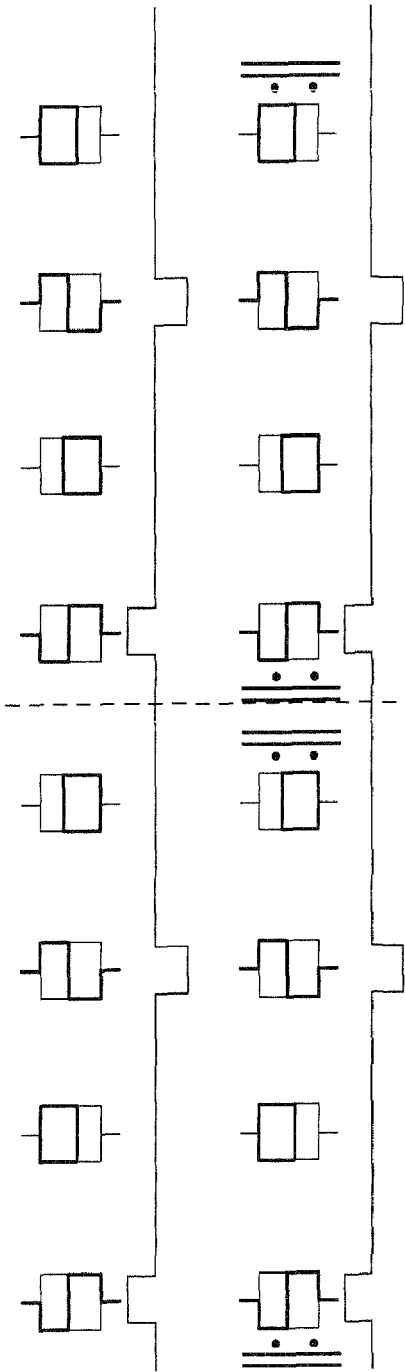
Fig. 4
Fig. 5
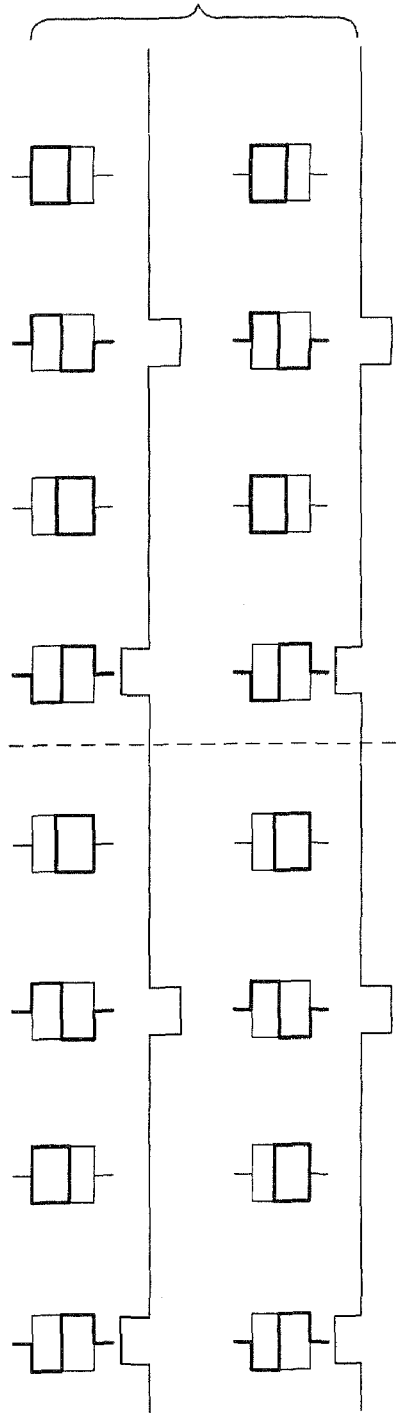
Fig. 6

DRIVING A FULL BRIDGE CIRCUIT

CROSS REFERENCE TO RELATED APPLICATION

This application claims priority under 35 U.S.C. §119(a) to German Application No. 10 2008 012 089.8, filed on Feb. 29, 2008, the entire contents of which are hereby incorporated by reference.

TECHNICAL FIELD

The invention relates to a method for driving a full bridge which produces an alternating output signal and arrangement for carrying out the driving method.

BACKGROUND

A half-bridge has two switching elements that are connected in series. The connection point of the switching elements constitutes the center point of the half-bridge. The center point of the half-bridge is switched alternately by the two switching elements to the positive pole and the negative pole of a direct-current power supply unit. A full bridge includes two half bridges, the center points of which are each switched at a desired frequency, that is to say, the basic frequency of the output signal of the full bridge, to the positive and negative pole of the direct-current power supply unit in a mutually opposite manner. An alternating-current load is arranged between those two center points.

The term "period" is used to refer to the period of time from connection of the positive pole of the direct-current power supply unit, disconnection of the positive pole, connection of the negative pole, disconnection of the negative pole, up to the time directly before the reconnection of the positive pole with respect to the alternating-current load by means of the switching elements. The order of the activation and deactivation of the switching elements within a period is referred to as the switching sequence.

In pulse-width control, the pulse width of the output signal is used to control the power of the output signal. The relationship of the period of time during which the alternating-current load is connected to the positive or negative pole relative to the total duration of a period is referred to as the pulse duty factor. A large pulse duty factor close to 100% accordingly results in waveforms wherein the load voltage has a high value over a high proportion of the period, while a small pulse duty factor results in waveforms having a small proportion. Accordingly, a large power level is produced or output at a large pulse duty factor and a relatively small power level is produced or output at a small pulse duty factor. The pulse duty factor can be adjusted by various control methods. One such method is the so-called phase shift method (rotary control method).

The drive signals of the switching elements of the first half bridge are phase-shifted with respect to the drive signals of the switching elements of the second half bridge during operation of the full bridge in a phase shift method. The phase shift can be half of a period of the alternating output signal. By changing the phase shift, the output signal can be changed. In particular, the power level thereof can be changed.

In principle, it is advantageous for the switching elements to be activated with a voltage which is as small as possible. If the voltage during activation is equal to zero volts, this is called zero voltage switching (ZVS). That is advantageous particularly when the switching element itself has a capacitance at its output. Such capacitance would have to be discharged if the voltage during activation is not equal to zero, which would lead to losses and heating of the switching elements.

In principle, it is also advantageous for the current through the switching element to be as small as possible during deactivation. If the current during deactivation is equal to zero, this is called zero current switching (ZCS). Zero current switching is recommended for switching topologies with leakage inductances in the half-bridge of the switching element and in switching elements which cannot be deactivated quickly, that is to say, in which a relatively large residual current flows, caused, for example, by charge carrier decomposition.

In principle, the objective is to achieve both ZVS and ZCS. However, that is often impossible because the switching times are selected in order to adjust a power level which is to be output and it is often not possible to consider the ZVS, ZCS conditions. For that reason, attempts are made to use the method which is adapted to the switching elements used. This is zero voltage switching (ZVS) in the case of MOSFETs because of the relatively high parallel body capacitance and zero current switching (ZCS) in the case of insulated-gate bipolar transistors (IGBTs) because of the relatively high residual current.

In principle, MOSFETs are preferably used with increasing frequency.

In conventional full bridges/full-bridge circuits, zero current switching is carried out for small pulse duty factors for the switching elements of the first half bridge and zero voltage switching is carried out for the switching elements of the second half bridge.

SUMMARY

In one general aspect, a full bridge that produces an alternating output signal is driven. Switching elements of the full bridge are operated in each period in a switching sequence that determines the order of the activation and deactivation of the switching elements including switching the switching elements in at least two different switching sequences. A first switching sequence is repeated n times before a second switching sequence is carried out, with n>1, or the switching elements are switched in at least three different switching sequences. The power at the output of the full bridge is adjusted by adjusting the pulse duty factor and the phase position of the drive signals of the switching elements.

Implementations can include one or more of the following features. For example, a second switching sequence can be repeated m times before the first switching sequence is carried out, with m>1. The values for n and m can be constant. n can be equal to m. One or more of n and m can be variable. The switching sequences can be operated with an irregular number of repetitions.

One or more of n and m can be determined in dependence on a temperature of at least one of the switching elements. One or more of n and m can be controlled in dependence on the temperature of at least one of the switching elements.

The switching elements can be switched with four different switching sequences. The four different switching sequences can be successive in time. A new order of activation and deactivation can be carried out for each switching element within four successive switching sequences when changing from one full bridge state to the next.

The switching sequences can be repeated in reverse order.

In another general aspect, a full bridge that produces an alternating output signal can be driven by operating switching elements of the full bridge in each period in a switching sequence that determines the order of the activation and deactivation of the switching elements including switching the switching elements in at least two different switching sequences; repeating a first switching sequence n times, with $n \geq 1$; repeating a second switching sequence m times, with $m \geq 1$, where one or more of n and m are variable; and adjusting the power at the output of the full bridge by adjusting the pulse duty factor and the phase position of the drive signals of the switching elements.

Implementations can include one or more of the following features. For example, one or more of n and m can be determined in dependence on the temperature of at least one of the switching elements. One or more of n and m can be controlled in dependence on the temperature of at least one of the switching elements.

The switching elements can be switched with four different switching sequences. The four different switching sequences can be successive in time. A new order of activation and deactivation can be carried out for each switching element within four successive switching sequences when changing from one full bridge state to the next.

The switching sequences can be repeated in reverse order.

In another general aspect, an arrangement includes a full bridge including four switching elements and a driving arrangement for driving the full bridge. The driving arrangement is configured to operate switching elements of the full bridge in each period in a switching sequence that determines the order of the activation and deactivation of the switching elements including switching the switching elements in at least two different switching sequences; repeat a first switching sequence n times before a second switching sequence is carried out, with $n>1$, or switch the switching elements in at least three different switching sequences; and adjust the power at the output of the full bridge by adjusting the pulse duty factor and the phase position of the drive signals of the switching elements.

Implementations can include one or more of the following features. For example, at least one switching element can be connected to a temperature sensor, with the driving arrangement adjusting the repetition of the switching sequences in dependence on the temperature measured by the temperature sensor.

In another general aspect, an arrangement includes a full bridge having four switching elements and a driving arrangement for driving the full bridge. The driving arrangement is configured to operate switching elements of the full bridge in each period in a switching sequence that determines the order of the activation and deactivation of the switching elements including switching the switching elements in at least two different switching sequences; repeat a first switching sequence n times, with $n \geq 1$; repeat a second switching sequence m times, with $m \geq 1$, where one or more of n and m are variable; and adjust the power at the output of the full bridge by adjusting the pulse duty factor and the phase position of the drive signals of the switching elements.

Implementations can include one or more of the following features. For example, at least one switching element can be connected to a temperature sensor, with the driving arrangement adjusting the repetition of the switching sequences in dependence on the temperature measured by the temperature sensor.

An object of the present invention is to provide a method and an arrangement for driving a full bridge in accordance with the phase shift method, wherein the thermal loading of both half-bridges is also reduced for rapid switching of the switching elements and small gating.

This object is achieved according to the invention by a method of the type mentioned in the introduction, with a first switching sequence being repeated n times before a second switching sequence is carried out, with $n>1$, or the switching elements are switched in at least three different switching sequences. The different thermal loading of the switching elements in the different half-bridges is thereby reduced. This means that a first switching sequence is repeated at least twice before a second switching sequence is carried out at least once. During the first switching sequence, a half-bridge is thermally loaded and, during the second switching sequence, the second half-bridge is thermally loaded so that, during that time, the first half-bridge is thermally unloaded. However, it is also conceivable to switch the switching elements in at least three different switching sequences so that one half-bridge is not thermally loaded excessively.

There may be provision for a second switching sequence to be repeated m times before the first switching sequence is carried out, with $m>1$. This means that each switching sequence is repeated at least twice before the other switching sequence is carried out. It may be provided that n and m are constant. It is possible for $n>m$ or, vice versa, also for $n<m$. The first switching sequence is repeated n times and subsequently the second switching sequence is repeated m times. This is again followed by the first switching sequence with n repetitions, and the second switching sequence is also subsequently carried out again m times. The switching sequences can be operated with a regular number of repetitions. If $n=m$, both switching sequences are repeated equally often so that the full bridge is controlled symmetrically and both half-bridges are thermally loaded in a uniform manner.

There may further be provision for n and/or m to be variable. The switching sequences can thereby be carried out with an irregular number of repetitions. A correction can thereby be carried out if one half-bridge should become heated more powerfully than the other.

There can further be provision for the first switching sequence to be repeated n times, with $n \geq 1$, and for a second switching sequence to be repeated m times, with $m \geq 1$, and with n and/or m being variable.

The values n and/or m can be determined in dependence on temperature of at least one of the switching elements. It can thereby be ensured that none of the switching elements becomes overheated and is thereby destroyed.

It may further be provided that n and/or m are/is controlled in dependence on the temperature of at least one of the switching elements. It can thereby be ensured that the switching sequences or the succession of the switching sequences are/is adjusted in such a manner that the switching elements always operate within a permissible temperature range and overheating of the full bridge circuit is prevented.

If very short voltage pulses occur at the output of the full bridge circuit, then the behavior of the switching elements differs in accordance with whether the switching element was already activated or not beforehand (in the preceding state) at the transition of the full bridge from one state into the next state, or remains activated, or not, afterwards (in the subsequent state). The problems are described by means of transistors. If a transistor was deactivated, becomes temporarily activated and, after the short period of time, is immediately deactivated again, load carriers which accumulate during activation do not yet result in complete saturation of the transistor in that short period of time. As a result, the transistor also becomes non-conductive very rapidly after the drive signal is deactivated.

If a transistor was activated and, in addition, the transistor which is diagonal relative thereto, that is to say, a transistor of the other half-bridge, is connected, sufficient load carriers are provided and the transistor also becomes saturated during the brief period of activation. As a result, it remains conductive for approximately 20% longer than in the previously described case, after the drive signal is deactivated, if the transistor was deactivated previously.

It is further advantageous if, on temporal average, the upper path, that is to say, the current path through the upper transistors of the two half-bridges (upper freewheeling) and the lower path, that is to say, the current path through the lower transistors of the two half-bridges (lower freewheeling) are used as the freewheeling path equally often. Otherwise, the path which is used more often would become heated more rapidly than the path which is used more seldom.

If only two switching sequences are carried out alternately, this may result in occurrences of asymmetry of the output voltage in the case of short voltage pulses at the output of the full bridge. A DC voltage may occur. Completely symmetrical control of the full bridge may provide assistance in this respect, in particular by the switching elements being switched with four different switching sequences. The four different switching sequences preferably follow each other directly, that is to say, without intermediate repetition of a switching sequence.

It is particularly advantageous if, for each switching element within four successive switching sequences, there is a different state of the full bridge for each activation and deactivation operation. The above-described disadvantages can thereby be avoided.

The switching sequences can further be repeated in reverse order.

The scope of the invention further includes an arrangement comprising an inverter and a driving arrangement for driving the inverter having a full bridge which comprises four switching elements, with the driving arrangement being configured in order to carry out the method according to the invention. Such an arrangement can operate without additional cooling because the heating of the switching elements is reduced or minimized. The switching elements are further loaded to a lesser degree and a longer service life of the switching elements is ensured.

At least one switching element can be connected to a temperature sensor, with the driving arrangement adjusting the repetition of the switching sequences in accordance with the temperature measured by the temperature sensor. It can thereby be ensured that the switching element does not become overheated.

Further advantages and features of the invention will be appreciated from the description and the figures of the drawings. The above features and those set out below can also be used according to the invention individually or in any combination with each other. The features illustrated in the figures are purely schematic and are not intended to be understood to be to scale.

BRIEF DESCRIPTION OF THE DRAWINGS

FIG. 3 is a timing diagram that shows states of the full bridge which is operated with one switching sequence;

FIG. 4 is a timing diagram that shows states of the full bridge which is operated with two different switching sequences;

FIG. 5 is a timing diagram that shows states of the full bridge which is operated according to the invention; and FIG. 6 is a timing diagram that shows states of the full bridge which is operated according to the invention in accordance with a method variant.

DETAILED DESCRIPTION

Figure 1:
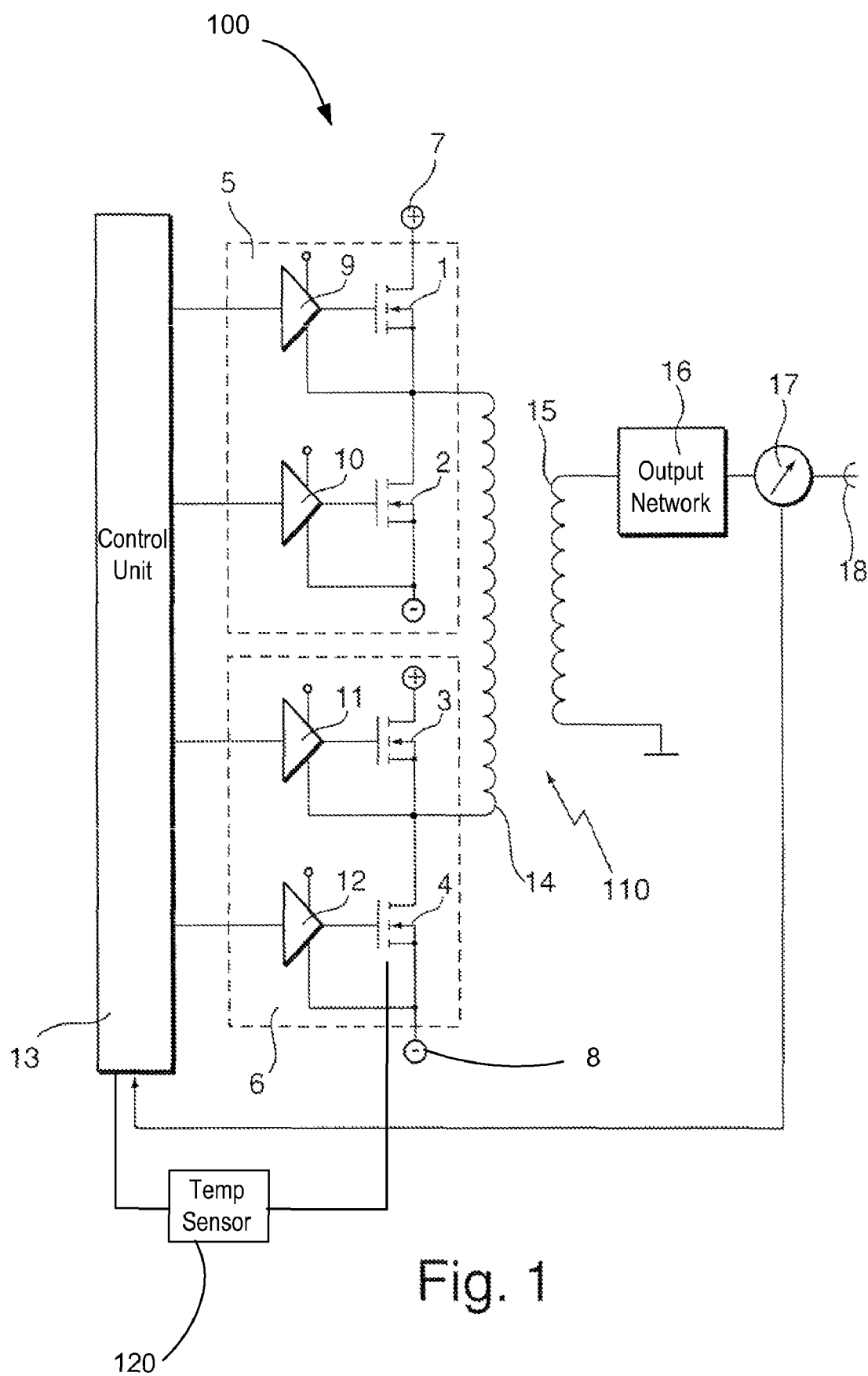
FIG. 1 is a diagram of a full bridge with a driver circuit and output network.

FIG. 1 illustrates a full bridge 100. The full bridge 100 has a first half bridge 5 having two series-connected switching elements 1, 2 and a second half bridge 6 having two series-connected switching elements 3, 4. Each of the switching elements 1, 2, 3, 4 can be a transistor. Each switching element 1, 2, 3, 4 is driven by a driver 9, 10, 11, 12, with the drivers 9, 10, 11, 12 being connected to a control unit 13 which outputs drive signals to the drivers 9, 10, 11, 12. By the phase position and the pulse duty factor of the drive signals being adjusted, the power at the output of the full bridge 100 can be adjusted.

The upper switching element 1, 3 of each half bridge 5, 6 is connected to the positive pole 7 of a DC supply voltage and the lower switching element 2, 4 of each half-bridge 5, 6 is connected to the negative pole 8 of the DC supply voltage.

The full bridge 100 functions as an inverter and is connected to a power transformer 110, which has a primary winding 14 and a secondary winding 15. An output network 16 and a measurement device 17 are arranged between the transformer 110 and an output 18. The output 18 can be connected to a load, which is not illustrated in greater detail. The measurement device 17 is connected to the control unit 13.

Figure 2:
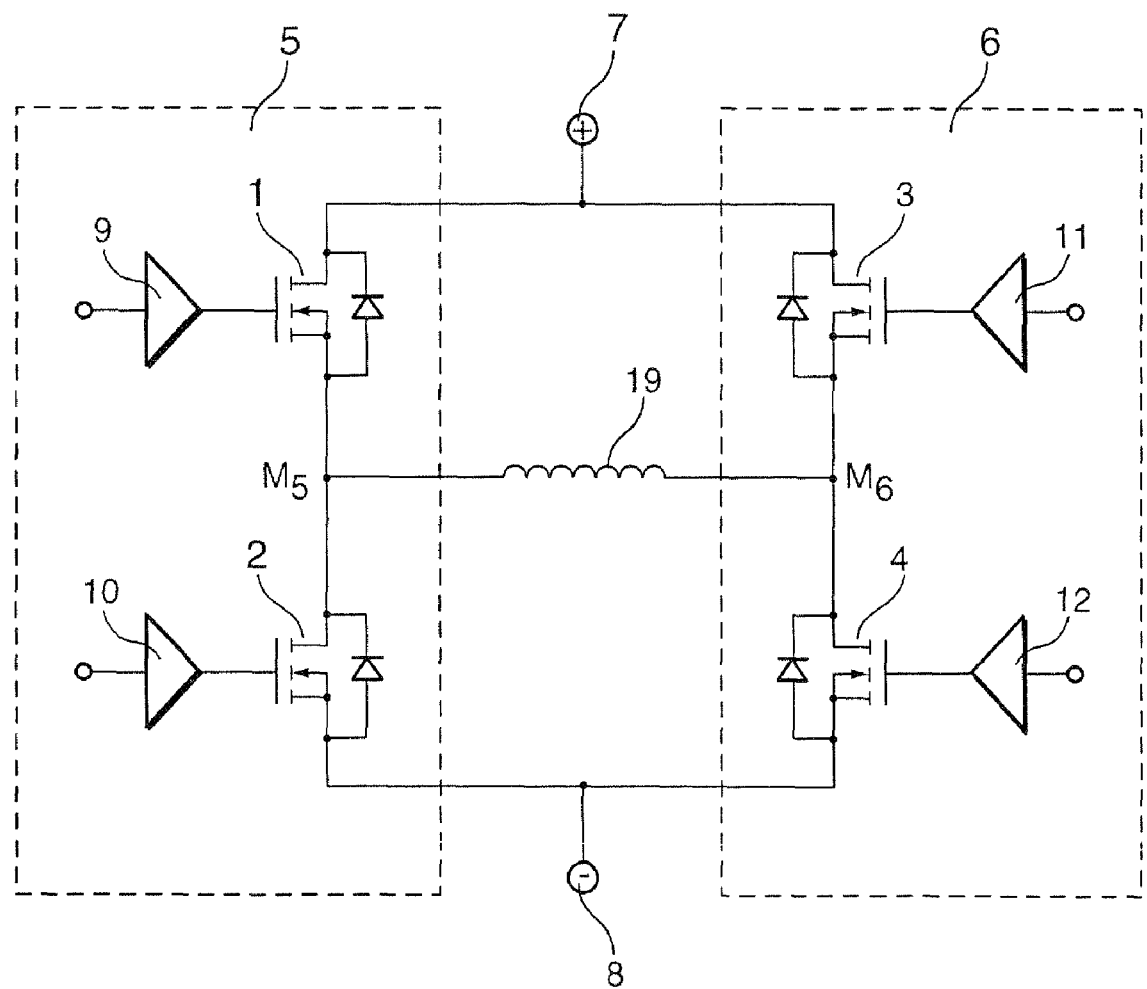
FIG. 2 is a diagram of a full bridge circuit that can be used in the full bridge of FIG. 1.

In order to explain the operation of the full bridge 100, FIG. 2 schematically illustrates a full bridge 100. There is connected, between the switching elements 1 and 2 of the first half bridge 5 and the switching elements 3 and 4 of the second half bridge 6, a coil 19 by means of which the output signal of the full bridge 100 can be decoupled, for example, by means of a transformer (such as the transformer 110) whose primary winding (such as the primary winding 14) is the coil 19. In another implementation, the switching elements 1 and 2 of the first half bridge 5 can be connected to the switching elements 3 and 4 of the second half bridge through a resonance network instead of through the coil 19.

If the switching element 1 of the first half bridge 5 and the diagonal switching element 4 of the half bridge 6 are activated simultaneously, and if the switching elements 2 and 3 are deactivated simultaneously, a current flows from the positive pole 7 of the DC voltage supply via the switching element 1, the coil 19, and the switching element 4 to the negative pole 8. In this first state of the full bridge 100, the center point $M_5$ of the first half bridge 5 is at the positive supply voltage potential of the DC voltage supply and the center point $M_6$ of the second half bridge 6 is at the negative supply voltage potential of the DC voltage supply. The first state corresponds to the first symbol in FIG. 3. A positive voltage pulse is illustrated below that symbol. This means that a positive voltage pulse or the DC supply voltage is present between the center points $M_5$, $M_6$ and accordingly at the output of the full bridge 100.

If the switching element 4 is subsequently driven in such a manner that it is deactivated, the coil 19 first continues to drive the current, the current then flows via the switching element 1, the coil 19, and the freewheeling diode that is parallel with the switching element 3. After a dead time, the switching element 3 can be activated so that the current now flows via the switching element 1, the coil 19, and the switching element 3 in a second state of the full bridge 100. The second state of the full bridge 100 is referred to as the upper freewheeling and is indicated by the second symbol in FIG. 3.

In the second state, there is no voltage between the center points $M_5$ and $M_6$, for which reason the line below the second symbol in FIG. 3 is solid.

Subsequently, the switching element 1 can be deactivated. First, there is produced a current flow via the freewheeling diode, which is parallel with the switching element 2, the coil 19, and the switching element 3. After expiration of a dead time after the switching element 1 has been deactivated, the switching element 2 can be activated so that at first the current flows via the switching element 2, the coil 19, and the switching element 3 in a third state of the full bridge 100. However, the center point $M_6$ is at the positive supply voltage and the center point $M_5$ is at the negative supply voltage. This results in a voltage reversal and a subsequent reversal of current through the coil 19. The third state of the full bridge, that is to say, when the switching elements 2 and 3 are activated, corresponds to the third symbol in FIG. 3. The negative supply voltage is between the center point $M_5$ and the center point $M_6$, which is indicated by the negative voltage pulse below the third symbol of FIG. 3.

If the switching element 3 is subsequently deactivated, the coil 19 at first drives the current further through the switching element 2 and the freewheeling diode that is parallel with the switching element 4. Subsequently, that is to say, after waiting for a certain dead time, the switching element 4 can be activated so that a current flow is produced through the switching element 4, the coil 19, and the switching element 2 in a fourth state of the full bridge 100. The fourth state of the full bridge 100 is referred to as lower freewheeling and is indicated by the fourth symbol in FIG. 3. The center points $M_5$ and $M_6$ are at the same potential, for which reason the line in FIG. 3 below the symbol 4 is solid.

The drive signals from the drivers 9, 10, 11, 12 to the switching elements 1 to 4 all have the same frequency. The drive signals also determine the frequency of the output signal of the full bridge 100, that is to say, the frequency of the change in voltage at the output (across the coil 19). The frequency of the output signal of the full bridge 100 corresponds to the basic frequency. The length of the associated period $T_1$ is indicated in FIG. 3 by the two broken lines. The full bridge 100 takes up the states described within the period $T_1$. The sequence of the four states is determined by the switching sequence of the switching elements 1 to 4 of the switching bridge within the period.

In FIG. 3, a second period $T_2$, which has precisely the same states of the full bridge 100 in the same sequence, follows the first period $T_1$. In FIG. 3, consequently, only one constantly repeating switching sequence is illustrated.

In FIG. 4, the switching states within the period $T_1$ correspond to those of the period $T_1$ of FIG. 3. The period $T_2$ also begins with the first state. However, the lower freewheeling follows the first state in the period $T_2$. And, the lower freewheeling is followed by the third state, which is followed by the upper freewheeling in the period $T_2$. Consequently, the order of the activation and deactivation of the switching elements during the second period $T_2$ is established in accordance with a second switching sequence that is distinct from the switching sequence during the first period $T_1$. Such a sequence is described in DE 10 2004 036 160 A1, which is incorporated herein by reference.

FIG. 5 illustrates a first embodiment of the method according to the invention. During a first period $T_1$, the upper freewheeling follows the first state of the full bridge 100, the third state follows the upper freewheeling, and the lower freewheeling follows the third state. This switching sequence therefore corresponds to the switching sequence within the period $T_1$ in FIG. 3. This switching sequence can be repeated n times, with n>1. This is indicated by the repeat signs known from music (double line with double dot) shown in FIG. 5. When the n repetitions have been carried out, a second switching sequence is carried out within a period of the basic frequency. In the second switching sequence, the first full bridge state is produced, a lower freewheeling follows the first full bridge state, and then the third state follows the first full bridge state, and the upper freewheeling follows the third state. The second switching sequence can also be repeated. In particular, the second switching sequence can be repeated m times. A plurality of variations are conceivable. For example, n and m can be unequal; however, n and m can also be equal, if n, m>1. It is further conceivable that n and m are different and are fixedly predetermined. It is further conceivable for n and/or m to be adjustable in a variable manner.

It is evident from FIG. 2 that the switching element at the bottom right (switching element 4) is activated and deactivated as follows:

$1^+$-$0_o$-$0^-$-$1_u$-$1^+$-$1_u$-$0^-$-$0^o$ (where 1: activated, 0: deactivated, +: positive voltage pulse at the output, −: negative voltage pulse at the output, O: upper freewheeling, u: lower freewheeling).

It can be seen that the following cycles for the switching element (transistor) 4 do not occur:

$0_o$-$1^+$-$1_u$; $1_u$-$1^+$-$0_o$; $1_u$-$0^-$-$1_u$; $0_o$-$0^-$-$0_o$.

This means that the method according to FIG. 4 can result in occurrences of asymmetry of the output voltage in the case of short voltage pulses at the output. A DC voltage can be produced. In order to control the full bridge symmetrically, it may be provided according to FIG. 6 that four different switching sequences follow each other. In a first period or switching sequence, the full bridge takes up a first state, followed by an upper freewheeling, followed by the third state, followed by the lower freewheeling. In the second period, a first state is switched, which is followed by a lower freewheeling, which is in turn followed by the third state, which the fourth freewheeling follows. In the third period or switching sequence, a lower freewheeling follows the first state, then the third state, and a lower freewheeling again. In the fourth period, an upper freewheeling follows the first state, then the third state and then again the upper freewheeling. This results in the following sequence of activation and deactivation for the switching element 4:

$0_o$-$1^+$-$0_o$-$0^-$-$1_u$-$1^+$-$1_u$-$0^-$-$0_o$-$1^+$-$1_u$-$0^-$-$1_u$-$1^+$-$0_o$-$0^-$-$0_o$.

This means that, for each transistor within four switching cycles, a new order of activation or deactivation always occurs when changing from one full bridge state to the next. The method variant according to FIG. 6 further causes, on average, the upper path and the lower path to be used as often as the freewheeling path. Consequently, one path is prevented from being heated more rapidly than the other path.

Referring again to FIG. 1, at least one switching element 1-4 can be connected to a temperature sensor 120, with the driving arrangement adjusting the repetition of the switching sequences in accordance with the temperature measured by the temperature sensor. It can thereby be ensured that the switching element does not become overheated.

Other Embodiments

A number of embodiments have been described. Nevertheless, it will be understood that various modifications may be made without departing from the spirit and scope of the invention. Accordingly, other embodiments are within the scope of the following claims.

What is claimed is:

1. A method of driving a full bridge that produces an alternating output signal, the method comprising:
   operating switching elements of the full bridge in each period ($T_1$, $T_2$) in a switching sequence that determines the order of activation and deactivation of the switching elements including switching the switching elements in at least two different switching sequences;
   repeating a first switching sequence n times before a second switching sequence is carried out, with n>1, or switching the switching elements in at least three different switching sequences;
   repeating the second switching sequence m times before the first switching sequence is carried out a second time, with m>1; and
   adjusting the power at the output of the full bridge by adjusting the pulse duty factor and the phase position of the drive signals of the switching elements.

2. The method of claim 1, wherein n and m are constant.

3. The method of claim 1, wherein n is equal to m.

4. The method of claim 1, wherein one or more of n and m are variable.

5. The method of claim 4, wherein the switching sequences are operated with a varying number of repetitions.

6. The method of claim 1, wherein one or more of n and m are determined in dependence on a temperature of at least one of the switching elements.

7. The method of claim 6, wherein one or more of n and m are controlled in dependence on the temperature of at least one of the switching elements.

8. A method of driving a full bridge that produces an alternating output signal, the method comprising:
   operating switching elements of the full bridge in each period ($T_1$, $T_2$) in a switching sequence that determines the order of activation and deactivation of the switching elements including switching the switching elements in four different switching sequences; and
   adjusting the power at the output of the full bridge by adjusting the pulse duty factor and the phase position of the drive signals of the switching elements;
   wherein the four different switching sequences are successive in time; and
   wherein a new order of activation and deactivation is carried out for each switching element within four successive switching sequences when changing from one full bridge state to the next.

9. A method for driving a full bridge that produces an alternating output signal, the method comprising:
   operating switching elements of the full bridge in each period in a switching sequence that determines the order of the activation and deactivation of the switching elements including switching the switching elements in at least two different switching sequences;
   repeating a first switching sequence n times, with $n \geq 1$;
   repeating a second switching sequence m times, with $m \geq 1$, where one or more of n and m are variable; and
   adjusting the power at the output of the full bridge by adjusting the pulse duty factor and the phase position of the drive signals of the switching elements.

10. The method of claim 9, wherein one or more of n and m are determined in dependence on the temperature of at least one of the switching elements.

11. The method of claim 10, wherein one or more of n and m are controlled in dependence on the temperature of at least one of the switching elements.

12. The method of claim 9, wherein the switching elements are switched with four different switching sequences.

13. The method of claim 12, wherein the four different switching sequences are successive in time.

14. The method of claim 13, wherein a new order of activation and deactivation is carried out for each switching element within four successive switching sequences when changing from one full bridge state to the next.

15. The method of claim 9, wherein the switching sequences are repeated in reverse order.

16. An arrangement comprising a full bridge and a driving arrangement for driving the full bridge that includes four switching elements, wherein the driving arrangement is configured to:
   operate switching elements of the full bridge in each period in a switching sequence that determines the order of the activation and deactivation of the switching elements including switching the switching elements in at least two different switching sequences;
   repeat a first switching sequence n times, with $n \geq 1$;
   repeat a second switching sequence m times, with $m \geq 1$, where one or more of n and m are variable; and
   adjust the power at the output of the full bridge by adjusting the pulse duty factor and the phase position of the drive signals of the switching elements.

17. The arrangement of claim 16, wherein at least one switching element is connected to a temperature sensor, with the driving arrangement adjusting the repetition of the switching sequences in dependence on the temperature measured by the temperature sensor.

* * * * *